United States Patent [19]

Taylor, Jr.

[11] Patent Number: 4,713,664
[45] Date of Patent: Dec. 15, 1987

[54] POINT CLUTTER THRESHOLD DETERMINATION FOR RADAR SYSTEMS

[75] Inventor: John W. Taylor, Jr., Baltimore, Md.

[73] Assignee: Westinghouse Electric Corp., Pittsburgh, Pa.

[21] Appl. No.: 738,126

[22] Filed: May 24, 1985

[51] Int. Cl.⁴ ............................................. G01S 13/52
[52] U.S. Cl. ..................................... 342/91; 342/160
[58] Field of Search ................. 342/91.93, 158, 160, 342/159, 162

[56] References Cited

U.S. PATENT DOCUMENTS

| | | | |
|---|---|---|---|
| 3,176,293 | 3/1965 | Nolen et al. | 342/91 |
| 3,465,336 | 9/1969 | Fishbein et al. | 342/91 |
| 3,500,396 | 3/1969 | Lampert et al. | 342/90 |
| 3,508,263 | 4/1970 | Thompson | 342/161 |
| 3,968,490 | 7/1976 | Gostin | 342/93 |
| 4,074,264 | 2/1978 | Wilmot | 342/91 X |
| 4,095,222 | 6/1978 | Mooney, Jr. | 342/93 |
| 4,104,633 | 8/1978 | Donahue et al. | 342/93 |
| 4,117,538 | 9/1978 | Shrader et al. | 342/160 X |
| 4,213,127 | 7/1980 | Cole | 342/93 |
| 4,249,177 | 2/1981 | Chen | 342/93 |
| 4,293,856 | 10/1981 | Chressanthis et al. | 342/162 X |
| 4,323,898 | 4/1982 | Barnes et al. | 342/188 X |
| 4,323,899 | 4/1982 | Barnes et al. | 342/188 X |
| 4,339,754 | 7/1982 | Hammers et al. | 342/165 X |
| 4,377,811 | 3/1983 | Mooney, Jr. et al. | 342/163 X |
| 4,431,993 | 2/1984 | Van Der Mark | 342/159 X |
| 4,450,446 | 5/1984 | Clancy et al. | 342/159 X |
| 4,463,356 | 7/1984 | Short, III et al. | 342/160 X |
| 4,542,382 | 9/1985 | Hol | 342/91 |

Primary Examiner—Theodore M. Blum
Assistant Examiner—Gilberto Barrón, Jr.
Attorney, Agent, or Firm—M. S. Yatsko

[57] ABSTRACT

An adaptive detection threshold system for moving target detector and moving target indicator radar systems. The threshold system uses data from the echo input signal to reconstruct a threshold level closely resembling the output clutter residue in doppler filters due to point clutter sources. At least three azimuth data values are used, with the values being from adjacent coherent processing intervals and separated in azimuth a distance approximately equal to the beamwidth of the antenna system. The data at the same range from the three azimuths is combined to form an estimate of the residue at the output of a doppler filter, assuming that the echo is caused by point clutter. Compensation for radar instability and changes in scan rate or interpulse period is included. Data from conventional constant false alarm rate processing designed to control alarms from distributed interference, such as weather echoes, is also used to compensate the residue estimate.

24 Claims, 4 Drawing Figures

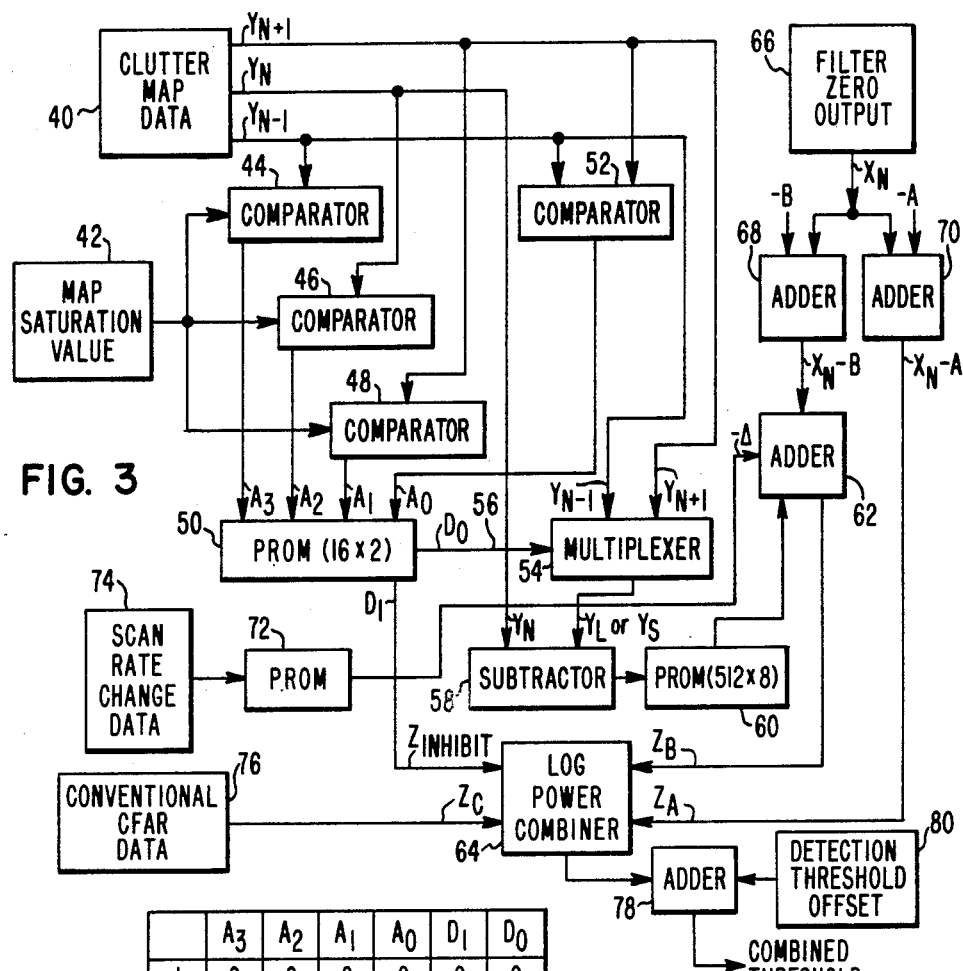

POINT CLUTTER THRESHOLD DETERMINATION FOR RADAR SYSTEMS

BACKGROUND OF THE INVENTION

This invention relates, in general, to radar systems and, more specifically, to the reduction of false point clutter alarms in ground-based radar systems.

Radar doppler filters are used in radar signal processors to attenuate echoes from undesired terrain and weather clutter. Such filters have an ability to attenuate a large portion of the clutter signals received by the radar system. However, even though a large percentage of terrain clutter is attenuated below the noise level, a significant amount of clutter residue appears at the output of the doppler filters. It is this residue which can be confusing to the signal processor of the radar system and cause it to incorrectly signal an alarm or otherwise incorrectly indicate the presence of an object in the view of the radar antenna.

In order to prevent false alarms from clutter residue appearing in doppler filter outputs, many radar systems establish a threshold value of the residue amplitude. The threshold value is the minimum value needed for an alarm to be indicated. The threshold level is established, in many cases, by the amount of clutter signal received by the zero doppler filters of the radar. According to this prior art technique, the clutter residue of the non-zero doppler filters must exceed a threshold value, derived from a fixed ratio of the clutter input to the filter bank, before an alarm is indicated.

The difficulty with this type of threshold determination is the fact that some types of clutter signals do not produce a doppler filter residue directly proportional to the applied clutter signal. In such cases, the threshold level must be adjusted to prevent alarms during the most unfavorable conditions. When this is accomplished, and since the more favorable conditions are governed by the same threshold level, the radar system's sensitivity to indicate a target is reduced.

The lack of relationship between the clutter input and the doppler filter output residue is especially prevalent when the clutter is derived from a point clutter source, such as a building or a tower. With such man-made objects, the input clutter to the doppler filters has a time-amplitude relationship similar to the antenna pattern of the radar system. As the antenna scans past the point clutter source, the skirts of the antenna radiation pattern begin to pick-up the clutter signals. The clutter signals reach a maximum when the antenna is pointing directly toward the point source. The output of the doppler filters is totally predictable, being a function of the antenna pattern, the scan rate, and the interpulse period of the radar system.

In order to use the fixed attenuation technique successfully, the false alarms on the skirts of the antenna beam were usually accepted to a certain degree, which could cause overloading of subsequent data handling stages in the radar signal processor. In general, an unsatisfactory compromise was made with most prior art systems between subclutter visibility and false alarms. The present invention drastically reduces the sacrifice in subclutter visibility necessary to reduce the number of clutter alarms to a tolerable level.

Along with point clutter, radar systems usually have apparatus for controlling the filter alarm rate due to distributed clutter residue at the output of each doppler filter, usually due to rain or extended ground clutter. Therefore, it is desirable, and it is an object of this invention, to provide a system by which the threshold level of radar doppler filters can be more responsive to the clutter residue of the filters, together with being responsive to conventional constant false alarm rate threshold determining systems.

Other prior art radar signal processors have made use of clutter maps to control the threshold when the radar antenna is synchronized with the map locations. While such techniques have been advantageous in reducing unwanted radar alarms, clutter map data is not completely responsive to the immediate state of the input clutter signal. Point clutter can vary dramatically from scan to scan; therefore the use of only clutter map data to determine the threshold for point clutter signals involves certain limitations in system performance. Therefore, it is also desirable and another object of this invention to provide a system for determining a alarm threshold level for doppler filters which is responsive to instantaneous changes in the clutter input.

Variations in the clutter residue are also dependent upon various other system parameters, such as changes in the scan rate of the antenna due to such things as wind loading, icing conditions, and motor voltage and frequency. In addition, clutter residue is dependent upon instability factors in the radar system. Therefore, it is desirable and it is another object of this invention to permit the establishment of a threshold level which takes into consideration the scan rate and the instability of the radar system.

SUMMARY OF THE INVENTION

There is disclosed herein a new and useful adaptive threshold system which is used to set the alarm threshold level of doppler filters to a level which closely matches the residue signal at the output of the doppler filters due to point clutter sources. The threshold system uses data corresponding to at least three azimuth positions of the antenna system, with the data being derived from adjacent coherent processing intervals in moving target detector (MTD) radar systems. The adaptive threshold level is governed by combinations of three or more azimuth data values in order to make the threshold level more closely match the residue curve rather than the input clutter from a point clutter source. Compensation of the threshold level determined from the three azimuth data values is provided by signals from the zero doppler filter output of an MTD system. Additional compensation is provided for other system variables, such as changes in the rate of scan of the antenna system, radar instability, and conventional constant false alarm rate processing.

One specific embodiment of the invention inhibits detection when there is a saturation condition present for the data from the three coherent processing intervals. When not saturated, the threshold system combines the largest of the clutter input values with the compensating signals by use of a log power combiner to provide the combined and compensated threshold level. By using some different parameters and variables, the moving target detector (MTD) embodiment described can be used with a moving target indicator (MTI) radar system.

BRIEF DESCRIPTION OF THE DRAWINGS

Further advantages and uses of this invention will become more apparent when considered in view of the following detailed description and drawings, in which:

FIG. 3 is a block diagram illustrating the implementation of the invention by a specific hardware configuration; and FIG. 4 is a table illustrating the contents of the 16×2 PROM shown in FIG. 3.

DESCRIPTION OF THE PREFERRED EMBODIMENTS

Figure 1:
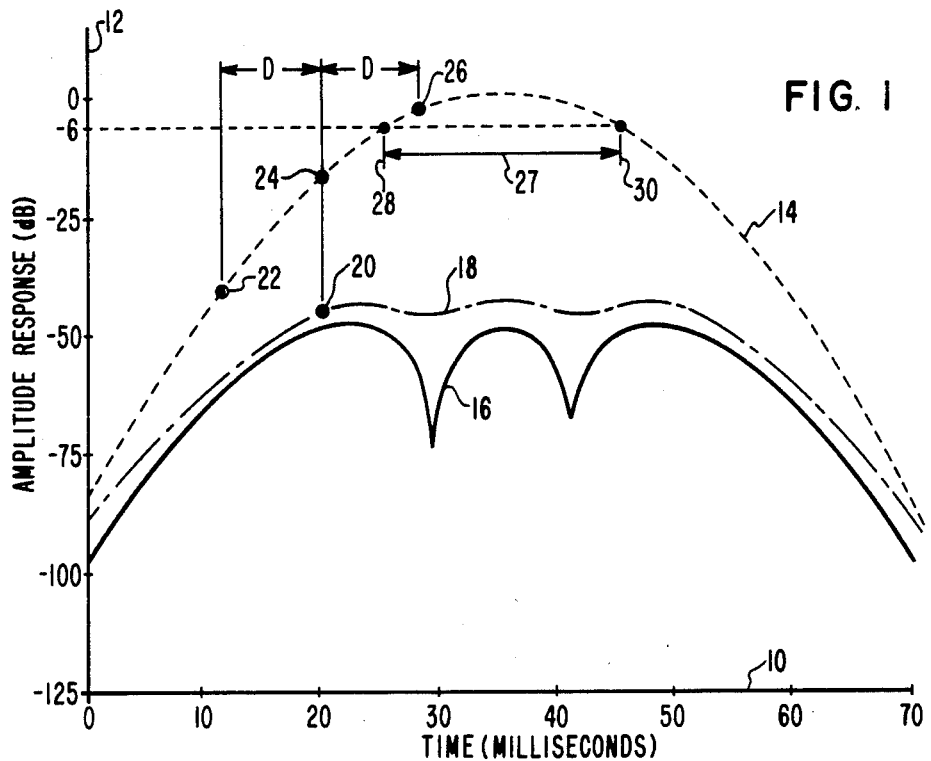
FIG. 1 is a graph illustrating the relationships between input clutter, threshold level, and filter residue for a typical non-zero doppler filter as the antenna scans past a stationary point of clutter.

Throughout the following description, similar reference characters refer to similar elements or members in all of the figures of the drawings.

Referring now to the drawings, and to FIG. 1 in particular, there is shown a graph which illustrates various time-amplitude responses in the threshold system. Axis 10 corresponds to the azimuth scan of the radar antenna system and axis 12 corresponds to the amplitude of the signal present at the doppler filter and to the threshold level. FIG. 1 is characteristic of the signals existing and applied to the first doppler filter of a moving target detector (MTD) radar system, such as the ASR-9 airport surveillance radar system.

In FIG. 1, curve 14 represents the clutter input signal to the doppler filter. Curve 14 is characteristic of the clutter input from a point source, and is dependent upon and shaped similar to the two-way (transmit and receive) radiation pattern of the antenna system of the radar. Curve 16 represents the clutter residue, or output of the doppler filter due to the input clutter of curve 14. Although the output residue is attenuated from the clutter input, the amount of attenuation varies over the scan interval. Doppler filters have attenuation specifications usually expressed as the ratio of the energy contents of curves 14 and 16, the power of each curve being integrated over the time period of the scan. Although the filter of FIG. 1 has an energy ratio or improvement factor of 45 dB, the instantaneous clutter attenuation ranges between approximately 13 dB near 0 and 70 milliseconds and 49 dB near the beam center at 35 milliseconds (ignoring the dips at 29 and 41 ms).

By observation of FIG. 1, it can be seen that the residue is not a reproduction of the clutter input attenuated by a fixed amount over the scan interval. Therefore, prior art threshold systems which use fixed attenuation ratios (approximately 13 dB in this example) to set the threshold for alarm indication have not been satisfactory in that, for some portions of the scan interval, the detection threshold is raised too much and non-detection of wanted aircraft or weather is increased.

The desirable feature of a threshold level is that it matches the clutter residue signal as closely as possible. Curve 18 represents the threshold level established by the present invention, as will be described later in more detail. Curve 18 is much closer to the shape of curve 16 than curve 14 attenuated by a fixed amount. Consequently, curve 18 provides a better threshold level for preventing unwanted clutter alarms and permitting detection of moving targets. It is emphasized that the threshold level of curve 18 may be moved up or down and fixed amount to set the actual signal needed from the filter to establish an alarm (threshold exceeded), however, the shape of curve 18 still closely matches the shape of the residue curve 16.

Curve 18 is developed by using a relationship of the points on curve 14. At least three points on curve 14 are used to determine the shape of curve 18. The actual location of curve 18 is a result of the curve shaping technique and of a fixed attenuation level which shifts curve 18 to below curve 14. Each point on curve 18 has a corresponding point directly above it on curve 14. This curve 14 point, plus one point from each side of it on curve 14, are used to set the value of a point on curve 18. According to one combining technique, the largest of the three points on curve 14 is selected to establish the location of the point on curve 18.

As an example, point 20 on curve 18 is governed by the points 22, 24 and 26 on curve 14. Point 20 is equal to the largest of the three points on curve 14 shifted by a predetermined amount. In this example, point 26 is the largest and the shift is approximately 42 dB. Point 24 is aligned over point 20 at the same time instant, while lagging point 22 and leading point 26 are displaced a distance D from points 20 and 24. Other points on the curve 18 are determined by, in a graphical sense, sliding the 2D-window located between points 22 and 26 across curve 14 and plotting the largest of the three points directly under the center point, with the derived points on curve 18 all attenuated the same known amount from the largest value in the 2D-window. This technique flattens the input clutter curve 14 and broadens its response to more closely resemble the residue curve 16.

Depending upon the method used, the data for the points 22, 24 and 26 is spaced as dictated by the system operating characteristics and by the frequency of available data points. In MTD radar systems, data is available for each coherent processing interval, therefore time D in FIG. 1 corresponds to the time of one coherent processing interval (CPI), or about 9 milliseconds in this specific embodiment. Consequently, data for the three points is acquired from three CPI's and the points calculated to fall on curve 18 are a result of manipulations on data from three CPI's. In order to get the broadened shape of curve 18, the 2D-window must approach or exceed the 6 dB two-way beamwidth of the antenna system. Since the curve 14 and the antenna system pattern are similar, the 6 dB two-way beamwidth for this antenna system can be represented by the distance (time) 27 between the 6 dB point locators 28 and 30. In the event the data from three adjacent CPI's is not displaced sufficiently in azimuth, data from additional or other CPI's would be needed, such as the two CPI's on each side of the center or current CPI. The multiple data samples may be combined in different ways to achieve the desired shape of the threshold curve 18. Sums of voltage or power of the data points are alternatives to selection of the largest.

Figure 2:
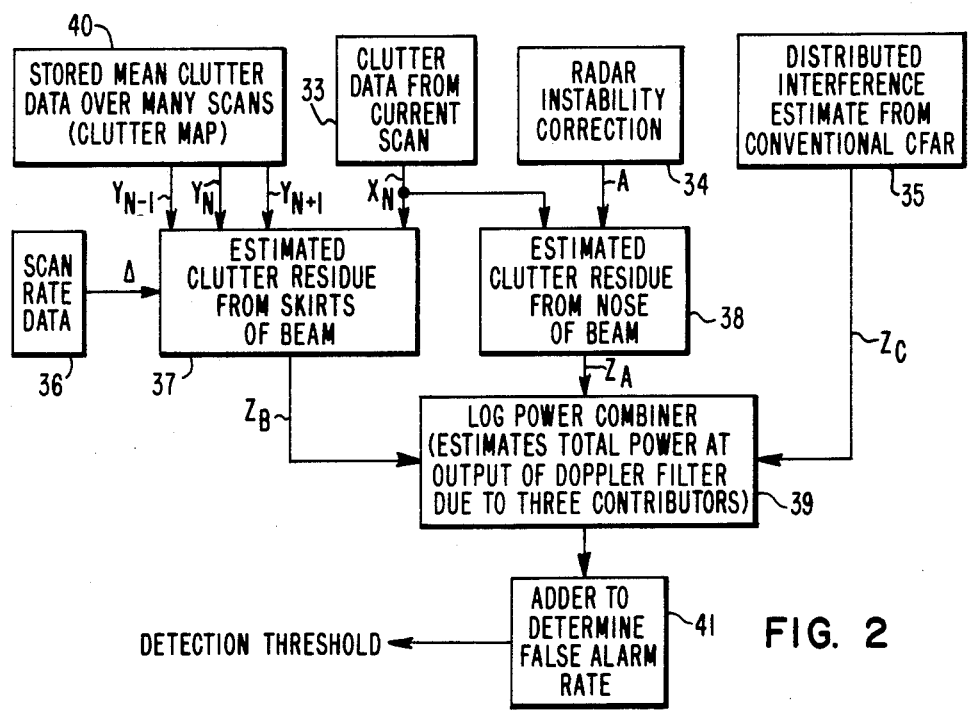
FIG. 2 is a data flow diagram illustrating the general concept of the invention.

FIG. 2 is a data flow diagram illustrating an overall embodiment of the present invention. Block 37 utilizes data from approximately one beamwidth of the antenna system and from the scan rate 36. In radar systems with clutter maps, this beamwidth data can be obtained directly from the clutter map 40 corresponding to data from adjacent CPI's. In radar systems without clutter maps, data would have to be saved in memory for at least two beamwidths of the antenna.

In order to make the threshold setting as responsive to the actual clutter input as possible, the stored data is compensated or supplemented by current, or present, clutter data, as shown by block 33. This data is conveniently obtained in some radar systems from the output of filter(s) responding to zero doppler, and in other radar systems, such as moving target indicator (MTI) systems, directly from the input echo data. The clutter data is further compensated or supplemented by radar instability correction data 34, as shown by block 38. The three forms of data are processed by the log power combiner 39 and added to an offset level by the adder 41 to give the desired detection threshold level with respect to time.

Radar instability is predominantly phase modulation of the return echoes. Scanning modulation produces predominantly amplitude modulation. Conventional constant false alarm rate (CFAR) data 35 is characteristic of the distributed clutter from rain and ground terrain which produces a residue which is noiselike. Therefore, combiner 39 adds the powers of the three components rather than their voltages to obtain the combined threshold level.

FIG. 3 is a block diagram of a circuit suitable for use in a specific embodiment of the invention wherein the data is combined based upon the largest of the three values. The threshold circuit of FIG. 3 assumes that the radar is a moving target detector (MTD) type having a clutter map 40 which contains data for different azimuths, to which coherent processing intervals (CPI's) are synchronized. The circuit uses data from three adjacent azimuth sectors: $Y_N$ for the current azimuth sector; $Y_{N-1}$ for the previous azimuth sector; and $Y_{N+1}$ for the next azimuth sector, which data was acquired over previous antenna scans and represents the mean amplitude of fluctuating clutter echoes.

Data from all three azimuth sectors is compared to maximum value 42 by the comparators 44, 46 and 48. The map saturation value 42 has a magnitude which indicates that the data coming from the clutter map is so large that it can yield an incorrect threshold level if used in the normal manner. The comparators have digital logic level outputs, with the output of each comparator being 1 only if the CPI data applied to the comparator is equal to or exceeds the map saturation value. According to the operation of the circuit, the threshold level is held to a level which prohibits detection of an alarm when two of the three CPI data values equal or exceed the saturation value. This function is provided by the 16×2 PROM 50 which is addressed by the outputs of the comparators 44, 46 and 48, and by the output of the comparator 52.

Comparator 52 compares the CPI's $Y_{N+1}$ and $Y_{N-1}$ and goes to a logic level 1 when $Y_{N+1}$ is equal to or greater than $Y_{N-1}$. The logic states of the four address lines going to the PROM 50 determine the logic status of the PROM data lines $D_0$ and $D_1$. FIG. 4 is a table indicating the address and data for each memory location in the PROM 50. Data output line $D_1$ determines whether or not detection will be inhibited, with a logic 1 inhibiting detection and a logic 0 allowing detection. As can be seen from FIG. 4, when two of the three address lines $A_1$, $A_2$ and $A_3$ are at logic 1, the detection is inhibited by a logic 1 in the $D_1$ output. For example, rows 7, 8 and 11-16 of FIG. 4 correspond to the situation where at least two of the CPI values equal or exceed the saturation value and detection is inhibited by a logic 1 in the $D_1$ column. The use of columns $A_0$ and $D_0$ in FIG. 4 will be discussed later herein.

Referring again to FIG. 3, multiplexer 54 has CPI's $Y_{N-1}$ and $Y_{N+1}$ applied thereto and, depending on the status of the input line 56 to the multiplexer 54, its output is either the larger ($Y_L$) or the smaller ($Y_S$) of the two inputs. As will be shown later by mathematical equations, $Y_L$ or $Y_S$ is selected depending upon the relationship of $Y_L$ and $Y_S$ to each other and to the saturation value.

The output of comparator 52 provides the $A_0$ address to PROM 50 and PROM data line $D_0$ provides the appropriate logic level to control the multiplexer 54 in selecting either $Y_{N-1}$ or $Y_{N+1}$. FIG. 4 illustrates the conditions which select the proper CPI data for the multiplexer 54, with a logic 1 in the $D_0$ column indicating that $Y_{N+1}$ is selected, and a logic 0 indicating that $Y_{N-1}$ is selected. No logic value in the $D_0$ column indicates that the selection is immaterial since the detection is inhibited by a logic 1 in column $D_1$. Column $A_0$ has a logic 1 if $Y_{N+1}$ is greater than $Y_{N-1}$ and a logic 0 if this condition does not exist. For example, according to row 1, columns $A_1$ and $A_3$ are 0 indicating that neither value exceeds M and column $A_0$ is 0 indicating that $Y_{N-1}$ is larger than $Y_{N+1}$. Thus, column $D_0$ is a logic 0 for selection of $Y_{N-1}$.

Again referring to FIG. 3, subtractor 58 yields the result $Y_L - Y_N$ or $Y_S - Y_N$, depending upon whether the input is $Y_L$ or $Y_S$. The output of subtractor 58 is applied to 512×8 PROM 60 which converts the 9-bit number applied thereto to an 8-bit value for use by the adder 62. The PROM output is identical to the input when the input is positive. When the input is negative, the output is the absolute magnitude of the input minus a constant (C) bottom limited to zero. Adder 62 has two additional inputs and an output to the log power combiner 64.

Filter zero output 66 provides data responsive to the current, or present, clutter signal, and is obtained from the output of the zero doppler filter pair in an MTD radar system. The output $X_N$ is for the current CPI azimuth and is applied to the adders 68 and 70. Adder 68 also has applied thereto an attenuation limit ($-B$) due to radar scan with the output of the adder 68 being $X_N - B$. The output ($Z_B$) of adder 62 is an estimate of clutter residue due to scanning of the skirts of the antenna beam and is one of the quantities used by the log power combiner 64. The present input of the clutter ($X_N - A$) is provided by the adder 70, where $-A$ is the clutter-noise attenuation limit due to radar instability and scanning of the beam nose.

In order to compensate for the change in the mechanical scan rate of the antenna system, a compensating value $-\Delta$ is applied to the adder 62. The value $-\Delta$ is a 4-bit value outputted by the PROM 72 depending upon the input to the PROM 72 from the scan rate change data 74. The rate of change in the scanning of the antenna system can be caused by wind and ice conditions, and by changes in the voltage and frequency of the power source supplying the antenna drive motor. The change data may be in the form of the number of azimuth change pulses over an interval of several CPI's.

The log power combiner 64 combines the signals applied thereto along with conventional constant false alarm rate (CFAR) data 76 to arrive at a combined or composite estimate of the total interference power in logarithmic (dB) form. This level is added by the adder 78 to the detection threshold offset 80 for determining the level above the interference at which an alarm is indicated by the radar system. In the circuit of FIG. 3, the echo amplitudes at the output of the doppler filters were first converted to a logarithmic format to reduce the number of bits required to cover the required dynamic range and to simplify subsequent arithmetic processes.

A mathematical representation of the invention is possible since the input values are processed according to specific relationships to yield a predictable result. For the MTD radar system assumed for FIG. 3, and using input values in log format, the adjustable parameters, measured variables, and system equations are defined in the following table:

TABLE 1

MTD

*Adjustable Parameters (dB except for K):*

A = Clutter-Noise Attenuation Limit due to Radar Instability and Scanning Beam Nose
B = Clutter-Noise Attenuation Limit due to Scanning Beam Skirt (Av. PRF & Scan Rate)
C = Overestimation of Amplitude of Clutter based on Linear Interpolation
M = Maximum Undistorted Clutter Map Value
K = Factor Defining Sensitivity to Variation of HITS/BEAMWIDTH
T = Detection Threshold Relative to Interference (Function of PFA)

*Measured Variables (dB):*

$X_n$ = Filter 0 Output on CPI(n)
$Y_n$ = Clutter Map Value on CPI(n)
$\Delta$ = K[Log (HITS/BEAMWIDTH) − Log (Average HITS/BEAMWIDTH)]
$Z_c$ = Distributed Interference Estimate Generated by Cell Averaging CFAR Plus Error Margin Based on Number of Valid Samples

*Equations:*

(1) $Z_A^* = X_n - A$
(2a) $Y_L$ = Larger of $Y_{n-1}, Y_{n+1}$
(2b) $Y_S$ = Smaller of $Y_{n-1}, Y_{n+1}$
(3) If $Y_L < M$, $Z_B^* = X_n + (Y_L - Y_n) - (B + \Delta)$
(4) If $Y_L \geq M$ and $Y_S < M$, $Z_B^* = X_n + (Y_n - Y_s) - (B + C + \Delta)$
(5) If two of three $(Y_{n-1}, Y_n, Y_{n+1}) \geq M$, INHIBIT DETECTION
(6) Adaptive Detection Threshold = T + Log Power Combination $(Z_A, Z_B, Z_C)$

*May be bottom limited at zero.

The equations of Table 1 define the operation of the circuit of FIG. 3, or its mathematical equivalent, in connection with an MTD radar system and how it sets the adaptive detection threshold to a close correspondence with the output clutter residue of the doppler filters.

When using the teachings of this invention with moving target indicator (MTI) radar systems, some changes in the input data may be accepted. Typically, MTI radar systems differ from MTD radar systems in certain respects. MTI systems have only a single doppler filter and do not have any zero doppler filter, have a variable interpulse period on a pulse-to-pulse basis, and have an output from each transmission with integration of multiple MTI outputs prior to the detection threshold. MTI systems generally do not have a clutter amplitude map, only a map defining where MTI is to be used.

Because of the data available in typical MTI systems, certain substitutions must be made to use the threshold system designed for MTD systems with MTI systems. In MTI systems, input echo data must be used as a substitute for the zero filter output $X_N$. Also, since the clutter residue will vary during the variable interpulse period (VIP) sequence, B should be defined for each interpulse period of the sequence, or the most unfavorable period in the sequence. Since no clutter map data $(Y_N)$ is available, at least two beamwidths of memory of input and output data must be provided. Spacing of three or more samples of $X_N$ can be chosen to best match the duration of the clutter residue. Compensation for the pulse-to-pulse fluctuation of clutter residue caused by the combination of variable interpulse period and antenna scanning is preferably accomplished by adaptive digital attenuation prior to integration of the multiple MTI outputs during the dwell time, that is, the time between the −6 dB points on the echo modulation of the point target. Such adaptive digital attenuation involves subtracting the adaptive attenuation value from the MTI output since both are in log format. Zero may be substituted for negative subtractor outputs when that simplifies the subsequent integration process.

For MTI radar systems, the adjustable parameters, measured variables, and equations become:

TABLE 2

MTI

*Adjustable Parameters:*

A = Clutter-Noise Attenuation Limit due to Radar Instability and Scanning Beam Nose (dB)
$B_m$ = Clutter-Noise Attenuation Limit due to Scanning and VIP for each of m Interpulse Periods in VIP Sequence (dB)
C = Overestimation of Amplitude of Clutter based on Linear Interpolation (dB)
M = Amplitude Sensed as Saturation (dB)
K = Factor Defining Sensitivity to Variation of HITS/BEAMWIDTH
T = Detection Threshold Relation to interference (dB) (Function of PFA)
d = Number of Interpulse Periods of Delay Introduced by MTI
b = Desired Interpulse Period Spacing of Clutter Samples

*Measured Variables (dB):*

$X_n$ = Echo Amplitude at input to MTI on Interpulse Period (n)
$\Delta$ = K[Log (HITS/BEAMWIDTH) − Log (Average HITS/BEAMWIDTH)]
$Z_c$ = Distributed Interference Estimate Generated by Cell Averaging CFAR Plus Error Margin Based on Number of Valid Samples

*Equations:*

(1) $Z_A^* = X_{n-d} - A$
(2a) $X_L$ = Larger of $X_{n-d-b}, X_{n-d+b}$
(2b) $X_S$ = Smaller of $X_{n-d-b}, X_{n-d+b}$
(3) If $X_L < M$, $Z_B^* = X_L - (B + \Delta)$
(4) If $X_L \geq M$ and $X_s < M$, and $X_{n-d} < M$, $Z_B^* = 2 X_{n-d} - X_s - (B + C + \Delta)$
(5) If two of three $(X_{n-d-b}, X_{n-d}, X_{n-d+b}) \geq M$, Cost Integrator by inhibiting both new input and feedback fraction
(6) Input to Integrator* = MTI Output − Log Power Combination $(Z_A, Z_B, Z_C)$

*May be bottom limited at zero.

It is noted that Equation 6 of Table 1 could be rewritten as an adaptive attenuation prior to a fixed threshold since the two are equivalent mathematically and very similar in complexity of implementation in hardware. Consequently, there is no fundamental difference between Tables 1 and 2 in this regard.

There has been disclosed a new and useful adaptive threshold system for eliminating false alarms due to point clutter. The threshold system recognizes the fact that the clutter residue at the output of a doppler filter of a stable radar system is not a fixed fraction of the clutter input. Compensation of the threshold by various changeable quantities is also taught. Methods of using the invention with either MTD or MTI radar systems are presented.

It is emphasized that numerous changes may be made in the above-described system without departing from the teachings of the invention. It is intended that all of the matter contained in the foregoing description, or shown in the accompanying drawings, shall be interpreted as illustrative than limiting.

I claim as my invention:

1. An adaptive detection threshold system for a radar having a scanning antenna system, said threshold system comprising:

means for obtaining data corresponding to the amplitude of clutter signals received by the radar for different azimuths of the radar antenna;

means for selecting at least first, second and third values of said data, with said first value being representative of the clutter amplitude received by the radar when its antenna is positioned in a first direction, said second value being representative of the clutter amplitude received by the radar when its antenna is positioned in a second direction, and said third value being representative of the clutter amplitude received by the radar when its antenna is positioned in a third direction, said second direction being located angularly between said first and third directions;

means for combining said first, second and third values;

means for controlling the detection threshold level for signals received when the radar antenna is in said second direction, with the controlling means being dependent upon a combined value derived from combining said first, second and third values; and means for inhibiting detection when more than one of said first, second and third values exceeds a predetermined saturation limit.

2. The threshold system of claim 1 including means for setting the combined value equal to the largest of said first, second and third value.

3. The threshold system of claim 1 including means for setting the combined value equal to a power summation of the first, second and third values.

4. The threshold system of claim 1 including means for setting the combined value equal to a voltage summation of the first, second and third values.

5. The threshold system of claim 3 including means for weighting the first, second and third values before summation.

6. The threshold system of claim 4 including means for weighting the first, second and third values before summation.

7. The threshold system of claim 1 including means for angularly spacing apart said first and third directions by approximately the 6 dB two-way beamwidth of the radar antenna.

8. The threshold system of claim 1 including means for separately obtaining said first, second and third values from three adjacent coherent processing intervals of the radar.

9. The threshold system of claim 2 wherein the controlling means includes means for setting the threshold level at a fixed predetermined amount of attenuation below the largest of the first, second and third values, and means for indicating an alarm when clutter residue exceeds said threshold level.

10. The threshold system of claim 1 including means for providing data representative of the present clutter signal, and wherein said controlling means further includes means using said data about the present clutter signal to change the threshold level established by the first, second and third values.

11. The threshold sytem of claim 10 wherein the radar is a moving target detector radar system, and including a zero doppler filter which provides the data representative of the present clutter signal.

12. The threshold system of claim 10 wherein the radar is a moving target indicator radar system including means for generating present input echo data, and including means for providing the present input echo data as the data representative of the present clutter signal.

13. An adaptive detection threshold system for a radar having a scanning antenna system, said threshold system comprising:

means for obtaining data corresponding to the amplitude of clutter signals received by the radar for different azimuths of the radar antenna;

means for selecting at least first, second and third values of said data, with said first value being representative of the clutter amplitude received by the radar when its antenna is positioned in a first direction, said second value being representative of the clutter amplitude received by the radar when its antenna is positioned in a second direction, and said third value being representative of the clutter amplitude received by the radar when its antenna is positioned in a third direction, said second direction being located angularly between said first and third directions;

means for combining said first, second and third values; and means for controlling the detection threshold level for signals received when the radar antenna is in said second direction, with the controlling means being dependent upon a combined value derived from combining said first, second and third values, said controlling means including means for compensating the detection threshold level for changes in the scan rate of the radar antenna system.

14. An adaptive detection threshold system for a radar having a scanning antenna system, said threshold system comprising:

means for obtaining data corresponding to the amplitude of clutter signals received by the radar for different azimuths of the radar antenna;

means for selecting at least first, second and third values of said data, with said first value being representative of the clutter amplitude received by the radar when its antenna is positioned in a first direction, said second value being representative of the clutter amplitude received by the radar when its antenna is positioned in a second direction, and said third value being representative of the clutter amplitude received by the radar when its antenna is positioned in a third direction, said second direction being located angularly between said first and third directions;

means for combining said first, second and third values; and means for controlling the detection threshold level for signals received when the radar antenna is in said second direction, with the controlling means being dependent upon a combined value derived from combining said first, second and third values, said controlling means including means for compensating the detection threshold level for changes in the interpulse period of the radar.

15. An adaptive detection threshold system for a radar having a scanning antenna system, said threshold system comprising:
   means for obtaining data corresponding to the amplitude of clutter signals received by the radar for different azimuths of the radar antenna;
   means for selecting at least first, second and third values of said data, with said first value being representative of the clutter amplitude received by the radar when its antenna is positioned in a first direction, said second value being representative of the clutter amplitude received by the radar when its antenna is positioned in a second direction, and said third value being representative of the clutter amplitude received by the radar when its antenna is positioned in a third direction, said second direction being located angularly between said first and third directions;
   means for combining said first, second and third values; and
   means for controlling the detection threshold level for signals received when the radar antenna is in said second direction, with the controlling means being dependent upon a combined value derived from combining said first, second and third values, said controlling means including means for compensating the detection threshold level for the variable interpulse period in a moving target indicator radar system.

16. An adaptive detection threshold system for a radar having a scanning antenna system, said threshold system comprising:
   means for obtaining data corresponding to the amplitude of clutter signals received by the radar for different azimuths of the radar antenna;
   means for selecting at least first, second and third values of said data, with said first value being representative of the clutter amplitude received by the radar when its antenna is positioned in a first direction, said second value being representative of the clutter amplitude received by the radar when its antenna is positioned in a second direction, and said third value being representative of the clutter amplitude received by the radar when its antenna is positioned in a third direction, said second direction being located angularly between said first and third directions;
   means for combining said first, second and third values; and
   means for controlling the detection threshold level for signals received when the radar antenna is in said second direction, with the controlling means being dependent upon a combined value derived from combining said first, second and third values, said controlling means including means for compensating the detection clutter threshold level for radar instability.

17. The threshold system of claim 1 wherein the means for controlling the detection threshold level includes means for power combining the largest of said first, second and third values with at least one other compensation signal value.

18. The threshold system of claim 17 including means for deriving said one other compensation signal value from conventional constant false alarm rate signal processing.

19. An adaptive detection threshold system for a moving target detector radar having a scanning antenna system, said threshold system comprising the combination of:
   a clutter map containing integrated values corresponding to the mean amplitude of echo signals received by the radar for different azimuths of the radar antenna;
   means for comparing three clutter map values corresponding to first, second and third adjacent azimuth locations of the map, with said second azimuth location being between said first and third azimuth locations, and said comparing means providing a first residue estimate value equal to the largest of said three map values at a time when the radar is obtaining new echo signal data for the second azimuth location;
   means for providing a second clutter residue estimate value derived from said new echo signal data;
   means for compensating the second clutter residue estimate value for changes in the scan rate of the radar antenna system;
   means for providing a third clutter residue estimate value derived from conventional constant false alarm rate signal processing;
   means for combining the first, second and third clutter residue estimate values to provide an estimated interference value;
   means for adding a fixed value to said estimated interference value to obtain a combined threshold value; and
   means for inhibiting the signalling of an alarm when more than one of the clutter map values exceeds a saturation limit.

20. The threshold system of claim 19 including means for generating values corresponding to said first, second and third azimuth locations spaced in time a total time period which is approximately equal to the time required for the antenna system to scan across its 6 dB two-way beamwidth.

21. A method of setting the alarm threshold limit for a radar having a scanning antenna system, said method comprising the steps of:
   obtaining echo data values from a present azimuth, from an aximuth leading the present azimuth, and from an azimuth lagging the present azimuth;
   selecting the largest value of said three azimuths;
   shifting the selected largest value a fixed level to establish the threshold level effective for data during the present azimuth;
   adjusting the established threshold level based upon the change in rate of scanning of the radar antenna; and
   repeating the steps of the method for each subsequent azimuth of the radar.

22. The method of claim 21 wherein the three azimuths provide data over a time period which is approximately equal to the time period required for the antenna to scan a distance equal to its 6 dB beamwidth.

23. The method of claim 21 including the step of adjusting the established threshold level based upon current echo data from a zero doppler filter.

24. The method of claim 21 including the step of adjusting the established threshold level based upon data from constant false alarm rate processing.

* * * * *